(12) United States Patent
Rieschl et al.

(10) Patent No.: US 7,184,944 B1
(45) Date of Patent: Feb. 27, 2007

(54) APPARATUS AND METHOD FOR THE SIMULATION OF A LARGE MAIN MEMORY ADDRESS SPACE GIVEN LIMITED RESOURCES

(75) Inventors: Michael J. Rieschl, Cottage Grove, MN (US); Qingyan Chen, Vadnais Heights, MN (US); Kurt N. Johnson, Edina, MN (US); Dave Q. Anderson, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 362 days.

(21) Appl. No.: 10/783,817

(22) Filed: Feb. 20, 2004

(51) Int. Cl.
*G06F 9/455* (2006.01)
*G06F 12/08* (2006.01)

(52) U.S. Cl. .................... 703/21; 711/113; 711/118; 711/209

(58) Field of Classification Search .................... None
See application file for complete search history.

(56) References Cited

U.S. PATENT DOCUMENTS

| | | | | |
|---|---|---|---|---|
| 4,769,770 A | * | 9/1988 | Miyadera et al. | 711/206 |
| 4,954,942 A | * | 9/1990 | Masuda et al. | 717/134 |
| 5,278,962 A | * | 1/1994 | Masuda et al. | 711/207 |
| 5,530,823 A | * | 6/1996 | Tsuchiya et al. | 711/207 |
| 6,230,114 B1 | * | 5/2001 | Hellestrand et al. | 703/13 |

\* cited by examiner

*Primary Examiner*—Gary Portka
(74) *Attorney, Agent, or Firm*—Beth L. McMahon; Charles A. Johnson; Mark T. Starr (57) ABSTRACT

A main memory simulation system includes storage files, a cache buffer, and an interface. The storage files includes both a fast look-up table and a slow look-up table. The fast look-up table is operable to directly obtain a page address that has been allocated to a main memory address while the slow look-up table is operable to first determine if a page address has been allocated to a main memory address and then to obtain the allocated page address. The interface operates to receive a request for transfer of main memory, in the form of a main memory address, from a storage file to the buffer of the cache. The interface responds by performing a page transfer between the storage file and buffer according to the page address that has been allocated to the requested main memory address, as found in the fast or slow look-up table.

35 Claims, 9 Drawing Sheets

APPARATUS AND METHOD FOR THE SIMULATION OF A LARGE MAIN MEMORY ADDRESS SPACE GIVEN LIMITED RESOURCES

FIELD OF THE INVENTION

The present invention relates generally to computer system testing. More particularly, the present invention relates to an efficient system and method for simulating large main memory address space.

BACKGROUND OF THE INVENTION

Computer hardware and software systems are often developed independently with a common timeline for completion, integration, and new product release. Thus, as an operating system is being designed and written and versions become available for testing and verification with the corresponding hardware, the hardware is not yet available because it is also still in development. While computer hardware models for testing and new product release may be created at various stages in the development of the operating system, these models are expensive and take time to create.

To aid in the testing of operating systems during development, software programs may be created to emulate hardware configurations, thereby making a software program under test believe that it is running on hardware. Hardware simulation tools have been used for this purpose for some time, but rapid growth in computer system size and capability has rendered existing hardware simulation tools ineffective or obsolete and has created a need for simulation tools that are capable of emulating today's advanced systems.

In particular, current simulation tools are not capable of simulating very large main memory, where very large main memory typically exceeds $2^{37}$ bits. Simulators were designed to simulate smaller memory spaces in a one-to-one simulated memory to file address range, but a large memory space cannot be accessed by an application or tool running on a computer system because of memory and file limitations that the application must operate in. The simulator is further constrained by size limitations and available resources when it is required to save and restore the simulated environment for subsequent review, debugging, and verification.

Thus, there is a need for a main memory simulation tool for simulating very large main memory that is capable of operating with limited resources while retaining the ability to save and restore a simulated environment.

SUMMARY OF THE INVENTION

The present invention substantially meets the aforementioned needs of the industry by providing an improved main memory simulator. A preferred embodiment of the simulator of the present invention includes a unique double buffering scheme that enables the simulator to simulate very large main memory address space. The double buffering system may utilize a fast memory access scheme to access more frequently used low-end memory and a slow memory access scheme for less frequent high-end memory access. Preferred embodiments of the simulator may also utilize a fast indexing technique and a series of small look-up tables for storing the last fast and slow memory addressed, memory fetches, or memory references, improving simulator speed and performance.

A main memory simulator for simulating large computer memories of the present invention generally includes a memory cache and a processor. The large computer memories are defined by memory addresses, each address containing data, however, the large computer memories are sufficiently large so as to prevent simulation via the use of one-to-one memory to file addressing for all of the memory addresses. In operation, the processor operates under instructions to move data contained in frequently used memory addresses to the cache on a fast memory access basis and operates under instructions to move data contained in infrequently used memory addresses to the cache on a slow memory access basis.

The main memory simulator may also be deemed to comprise a means for storing data, a means for processing instructions, and a means for providing instructions to said means for processing instructions. The means for providing instructions provides the instruction to transfer data by identifying a memory address of the data. The means for processing the instruction then transfers the data to the means for storing by determining if the memory address of the data is a frequently or infrequently used memory address. In the instance of a frequently used memory address, the data is transferred via a fast memory access scheme, and in the instance of an infrequently used memory address, the data is transferred via a slow memory access scheme.

A main memory simulation system of the present invention generally includes the elements of storage files, a cache that includes a buffer, and at least one interface. The storage files include both a set of fast look-up tables and a slow look-up table. The set of fast look-up tables is operable to directly obtain a page address that has been allocated to a main memory address while the slow look-up table is operable to first determine if a page address has been allocated to a main memory address and then to obtain the allocated page address. The interface operates to receive a request for transfer of main memory, in the form of a main memory address, from a storage file to the buffer of the cache. The interface responds by performing a page transfer between the storage file and buffer according to the page address that has been allocated to the requested main memory address, as found in the fast or slow look-up table.

The main memory simulation system may also be deemed to comprise a means for determining the frequency of use of a main memory address, a means for obtaining a page address corresponding to the main memory address, and a means for transferring data to a memory location. The means for obtaining a page address generally includes a means for obtaining a page address corresponding to the main memory address when the main memory address has been determined to be frequently used and includes a means for obtaining a page address corresponding to the man memory address when the main memory address has been determined to be infrequently used.

A method of memory transfer of the present invention, for use in simulating main memory, includes the steps of: (1) obtaining a main memory address which indicates that a request for main memory transfer between a storage file and a cache buffer has occurred; (2) determining if the main memory address is an address that is accessed frequently or infrequently; (3) if the main memory is frequently addressed, then directly obtaining a page address that has been allocated to the main memory address through the use of a first look-up table; (4) if the main memory is infrequently addressed, then first determining whether a page address has been allocated to the main memory address, then obtaining the page address that has been allocated to the main memory address; and (5) transferring the requested main memory between the storage file and the cache buffer via a page transfer that utilizes the page address allocated to the main memory address.

The above summary of the present invention is not intended to describe each illustrated embodiment or every implementation of the present invention. The following figures and detailed description more particularly exemplify the embodiments of the present invention.

BRIEF DESCRIPTION OF THE DRAWINGS

The present invention may be more completely understood in consideration of the following detailed description of various embodiments of the invention in connection with the accompanying drawings, in which.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention can be more readily understood by reference to FIGS. 1–9 and the following description. While the present invention is not necessarily limited to such applications, the invention will be better appreciated using a discussion of example embodiments in such a specific context.

Figure 1:
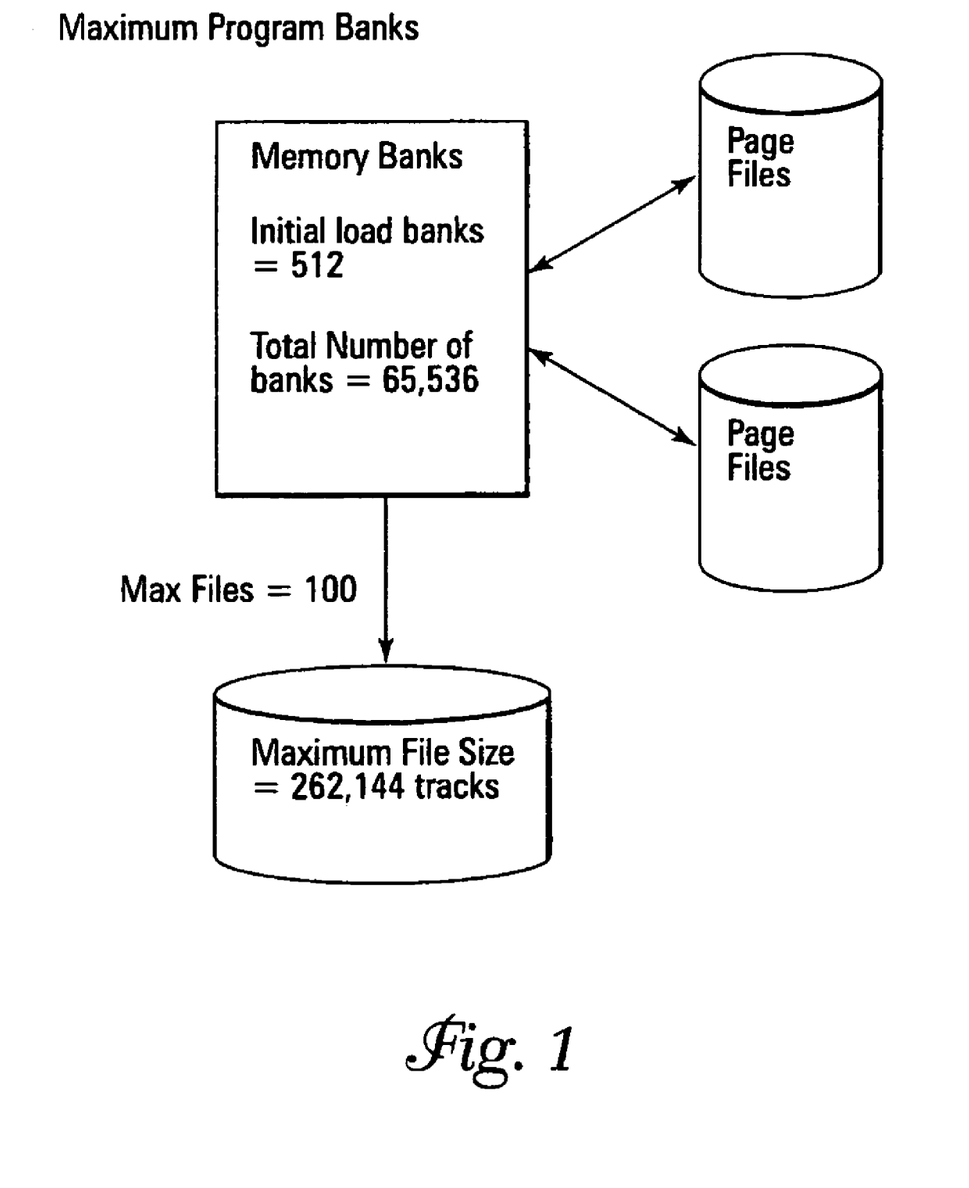
FIG. 1 is a diagram of an example main memory simulator host system in accordance with one embodiment of the present invention.

FIG. 1 is a diagram of an exemplary main memory simulator host system in accordance with one embodiment of the present invention. In one embodiment, the memory simulator of the present invention, which may be part of a large system simulation tool, is initially loaded on a host system. In one embodiment, the host system may have a total of 65,536 memory banks available and the memory simulator may be initially loaded on up to 512 of the available memory banks. A memory bank is limited to 262,144 words and each bank used to simulate main memory must be saved to a file between simulation sessions. In one embodiment, the total number of files available to the memory simulator is 100 and each file is limited to 262,143 tracks. A track is 1792 words and a word is 36 bits. The system simulation tool, and thus the memory simulator, are thereby limited by the available resources of the host system.

A memory simulation tool in accordance with the present invention comprises software emulating a hardware configuration that is operable to simulate a target large main memory address space for testing and verification of memory addressing within overall operating system functionality. The target memory is controlled by a broader operating system, whose instructions are also simulated, and comprises a paged memory scheme that may have memory pages located both in and out of memory. When memory pages are not in memory, the pages are paged to simulated files.

During a simulation of the operating system, the memory simulator portion controls the memory scheme and the paged files at the lowest level. Thus, one embodiment of the memory simulator described herein is a part of a total simulation package that is used to simulate an operating system. The simulator may have many sub-simulator partitions that are independent of each other. For example, an instruction processor simulator, input/output processor simulator, tape and disk simulator, and main memory simulator will all communicate with one another through defined interfaces. Thus, the instruction processor simulator will access the main memory simulator in order to access an instruction from memory or to read or write data to or from memory.

The file paging mechanism of the present invention is a software mechanism that allows the simulation tool to access pages of a file. In one embodiment, a file is 262,143 tracks, where one track is 64 sectors, or 1792 words. A page is 28 words, or one sector. Individual page boundaries within a file are generally transparent to the simulation tool and pages are read into a bank, or cache, as needed. A group of pages that is created and paged by the file paging mechanism to access a particular area of memory forms a block of main memory. A block of main memory begins on a page boundary within a file and the size of the block will depend upon the total size of the main memory being simulated and the number of banks available for memory look-up. In one embodiment, a block of main memory may comprise 762 pages.

The simulation tool of the present invention is generally more limited in resources than the target memory being simulated. For example, the target memory may be on the order of $2^{52}$ words, where a word is sized at 36 bits. The operation of the simulation tool is thus affected by the speed of memory access. The faster data from simulated memory may be accessed, the faster a simulated instruction processor or data reference will operate. As discussed above, the extent of application banks needed to control the simulation tool will affect the operability of the simulation tool, as will the required simulation files. The size and number of files used for memory, and required to save and restore structures used to simulate the main memory and the data itself, will also affect the performance of the simulation tool.

To improve the speed of memory access, the simulation tool utilizes fast memory look-up tables and a slow memory look-up table. The fast memory tables are used to access memory that is used or accessed more frequently, where in one embodiment the more frequently accessed memory is the memory having an address below some bit size, for example less than 01000000303000 words, which is approximately equal to 36 bits. This memory is referred to as low-end memory. Less frequently accessed memory is the memory having an address above some bit size, for example greater than or equal to 01000000303000 words, and is less frequently accessed because it is less frequently used by the operating system being simulated. This high-end memory is accessed via slow memory look-up tables. TABLE 1 below provides the specifications used according to one embodiment of the present invention for the fast and slow memory look-up tables. Note that a little more than 36 bits of memory is fast memory because the page used by the file paging system 108 is 28 words.

TABLE 1

EXEMPLARY FILE PAGING SYSTEM SPECIFICATIONS

| | |
|---|---|
| Page Size | 28 words |
| Number of words per fast/slow memory look-up table entry | 051350 words |
| FAST MEMORY LOOK-UP SPECIFICATIONS | |
| Fast Memory Banks | 64 banks |
| Number of words per fast memory table | 010000003030 words |
| Total Fast Memory Size | 01000000303000 words |
| SLOW MEMORY LOOK-UP SPECIFICATIONS | |
| Slow Memory Banks | 1 |
| Number of words per slow memory table | 04001255400 words |
| Total Slow Memory Size | 04001255400 words |

Figure 2:
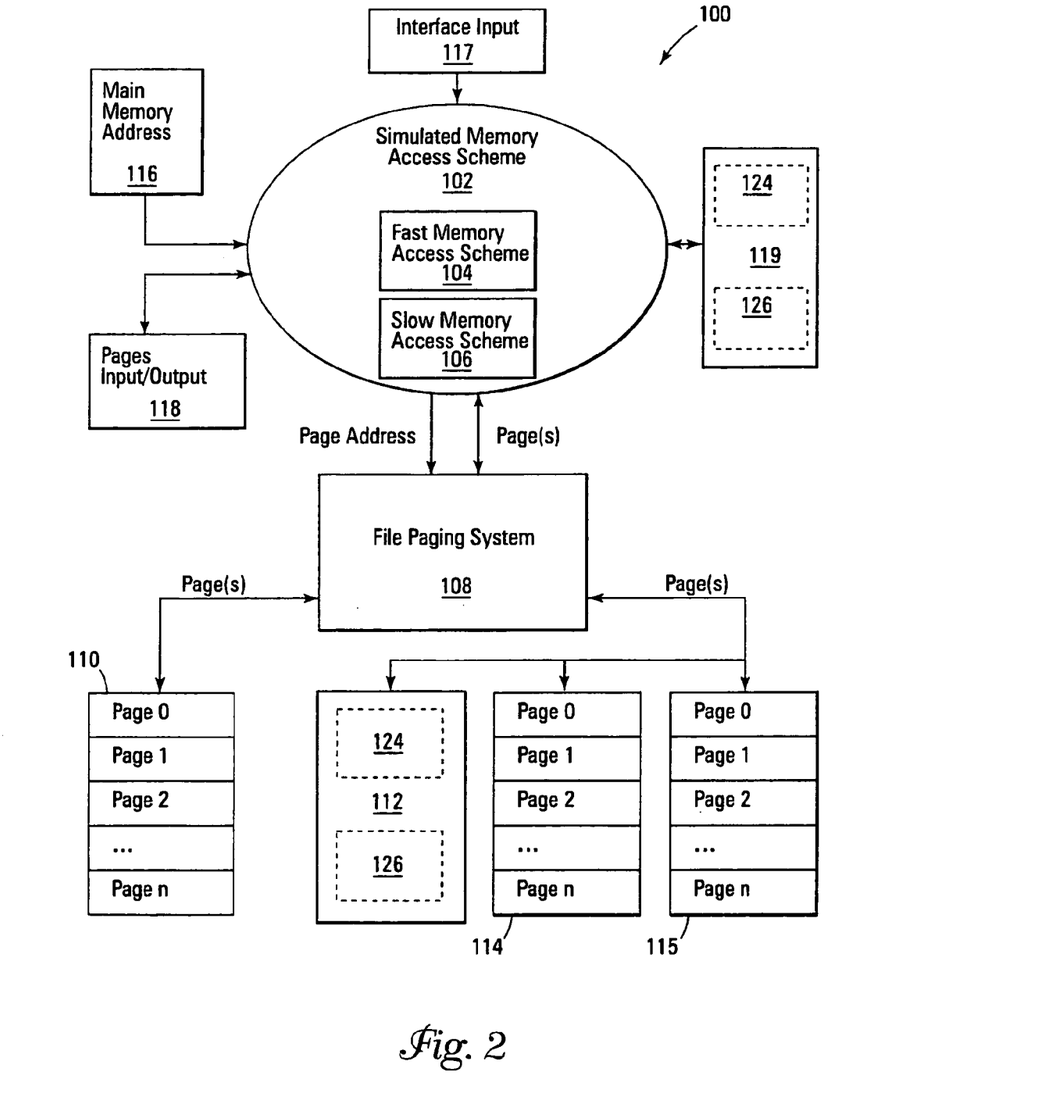
FIG. 2 is a block diagram of a main memory simulator in accordance with one embodiment of the present invention.

Referring to FIG. 2, a main memory simulator 100 in accordance with the present invention comprises a simulated memory access scheme 102 and a file paging system 108, which utilize paged and addressable virtual memory to enable simulation. The file paging system 108 comprises a cache 110 and a series of files 112, 114 and 115, and controls the movement of pages between the cache 110 and one or more files. The file paging system 108 is a software mechanism that enables the simulator 100 to access a page or pages of larger files. In one embodiment, the simulator 100 may page up to 100 files at one time.

The cache 110 is a high-speed buffer storage, or memory bank, and accesses simulated memory within the main memory simulator 100 through a plurality of interfaces, or codes, that are input into the main memory simulator 100 by a user at an interface input 117. The interfaces may be read interfaces or write interfaces. If a write interface is input, a page or a portion of a page will be input, or written, to the simulated memory within the memory simulator 100. If a read interface is input, a page or portion of a page will be output from the simulated memory. In one embodiment of the memory simulator 100, the read and write interfaces are as shown below in TABLE 2.

TABLE 2

| | INTERFACE | ACTION |
|---|---|---|
| READ | RMEMP$ | Read a partial word of main memory from the cache |
| | RMEMW$ | Read a full word of main memory from the cache |
| | MMOVW$ | Read a block of main memory from the cache |
| WRITE | WMEMP$ | Write a partial word of main memory to the cache |

TABLE 2-continued

| INTERFACE | ACTION |
|---|---|
| WMEMW$ | Write a full word of main memory to the cache |
| MMOVW$ | Write a block of main memory to the cache |

Each of the interfaces may be input to the main memory simulator 100 by a user at the interface input 117. The main memory address 116 and the corresponding input or output are provided by the file paging system 108, which recognizes an entered input or output interface and performs the corresponding action. If the interface is a write interface, a page or a portion of a page is input at pages 118, and if the interface is a read interface, a page or portion of a page is output at pages 118. Further, the cache 110 may be flushed, thus allowing all data to be saved to a file.

In a preferred embodiment in which three files 112, 114, and 115 are used for main memory simulation, the first file 112 is used to store the fast memory look-up tables 124 and a slow memory look-up table 126. The fast memory and slow memory look-up tables 124 and 126 initially store zeroed entries. When a simulation is started, the fast and slow look-up tables 124 and 126 are moved from file 112 into run-time memory banks 119. When a simulation has ended, the fast and slow look-up tables 124 and 126 are moved back to the file 112. In one embodiment, there are 64 fast look-up tables 124 and one slow look-up table 126 in the file 112. When an address of memory is accessed, each word of fast memory and slow memory is addressable by a paging virtual address in the corresponding look-up table 124 or 126. Thus, the memory simulator 100 is controlled by the file paging system 108 and the fast and slow look-up tables 124 and 126. The fast memory look-up tables 124 are configured to be a one-to-one memory map that does not require a search scheme, while the slow memory look-up table 126 is a list of addresses that does require a search scheme to locate a particular address.

The second file 114 is used to page look-up table entry memory spaces, of 051350 words, having even numbered paging addresses and the third file 115 is used to page memory spaces having odd numbered paging addresses. Within the main memory simulator 100, the file paging system 108 is operative to access a particular file and bring pages of that file into the cache 110. From there the data within the file may be accessed and the paging system 108 may automatically page out portions of the pages within the cache 110 that have not been accessed within a period of time.

The simulated memory access scheme 102 of the present invention further comprises a fast memory access scheme 104 and a slow memory access scheme 106. Fast memory access 104 is the preferred method for main memory simulation in the main memory simulator 100 and utilizes a set of look-up tables (see FIG. 3). When simulating a very large main memory address space, as may be accomplished by the main memory simulator 100 of the present invention, the simulator 100 running as a program or application operates with limited resources, namely reduced memory and file storage space as described above, and cannot manage the entire main memory address space of a modern computer. Further, the main memory simulator 100 of the present invention preferably has the capability to save and restore its environment over a period of time. Such a capability requires that all simulated memory look-up tables be small enough to be stored in files.

In one embodiment of the main memory simulator 100 that utilizes both fast memory access 104 and slow memory access 106, low-end memory will generally be accessed much more frequently then high-end memory, although this access arrangement may vary depending upon the operating system being simulated. Assuming this arrangement, however, low-end main memory is memory having a memory address of less than 01000000303000 words, or about 36 bits. Thus, low-end main memory will use fast memory access 104 because it is much more frequently accessed and high-end memory will use slow memory access 106 because it is comparatively less frequently accessed. This access scheme is operable to improve the performance of the memory simulator 100 of the present invention. The fast memory double buffering scheme operating in cooperation with the slow memory look-up table 106 provides the look-up table space to enable the simulator 100 to simulate a very large main memory address space.

Figure 3:
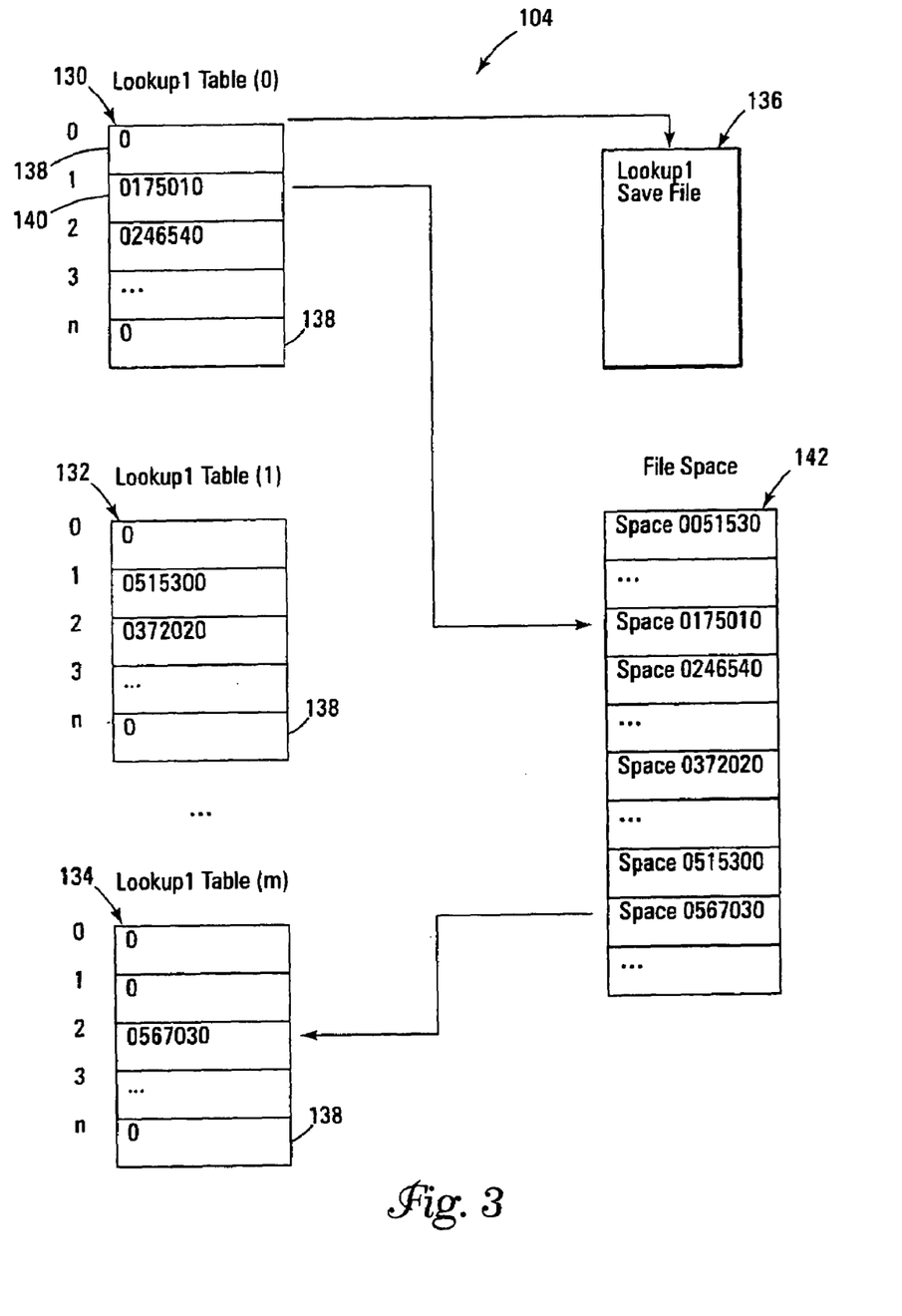
FIG. 3 is a block diagram of fast memory access in accordance with one embodiment of the present invention.

Fast memory access may access a portion of simulated memory without performing a table search. Rather, fast memory access utilizes a set of look-up tables that address a block of main memory directly by indexing into a table. In one embodiment, fast memory access will be used on addresses from 0 to 01000000302777 words. Referring to FIG. 3, the fast memory access scheme 104 utilizes a set of look-up tables 130, 132, and 134 that are stored in file 112 (shown in FIG. 2). In an alternate embodiment, the look-up tables 130, 132, and 134 may be located in different memory banks. When a simulation session running on the main memory simulator 100 ends, the look-up tables 130, 132, and 134 may be saved in files. In FIG. 3, look-up table 130 is saved to save file 136. By transferring the look-up table 130 to save file 136, simulation session parameters may be revisited in the future for review or further testing.

To accommodate the preferred page size as described above with reference to the embodiment of FIG. 2, the fast memory look-up tables 130, 132, 134 are part of a set of 64 individual tables, or banks, where each of the 64 banks represents 010000003030 words. Each of the 64 banks represents a memory space that is divisible by 28, the number of words in each page. Each paging address in a fast look-up table 130, 132, 134 represents either a paged address 140 or an unallocated address space, denoted by a zero 138. The paged address 140 in look-up table 130 points to the actual main memory space accessible in the file 142. If a paged address space has not been allocated, the paged address identifying the next available space will be referenced from file space 142. The next available page space address of a file is then calculated and that paged space address is used for the next allocation.

Figure 4:
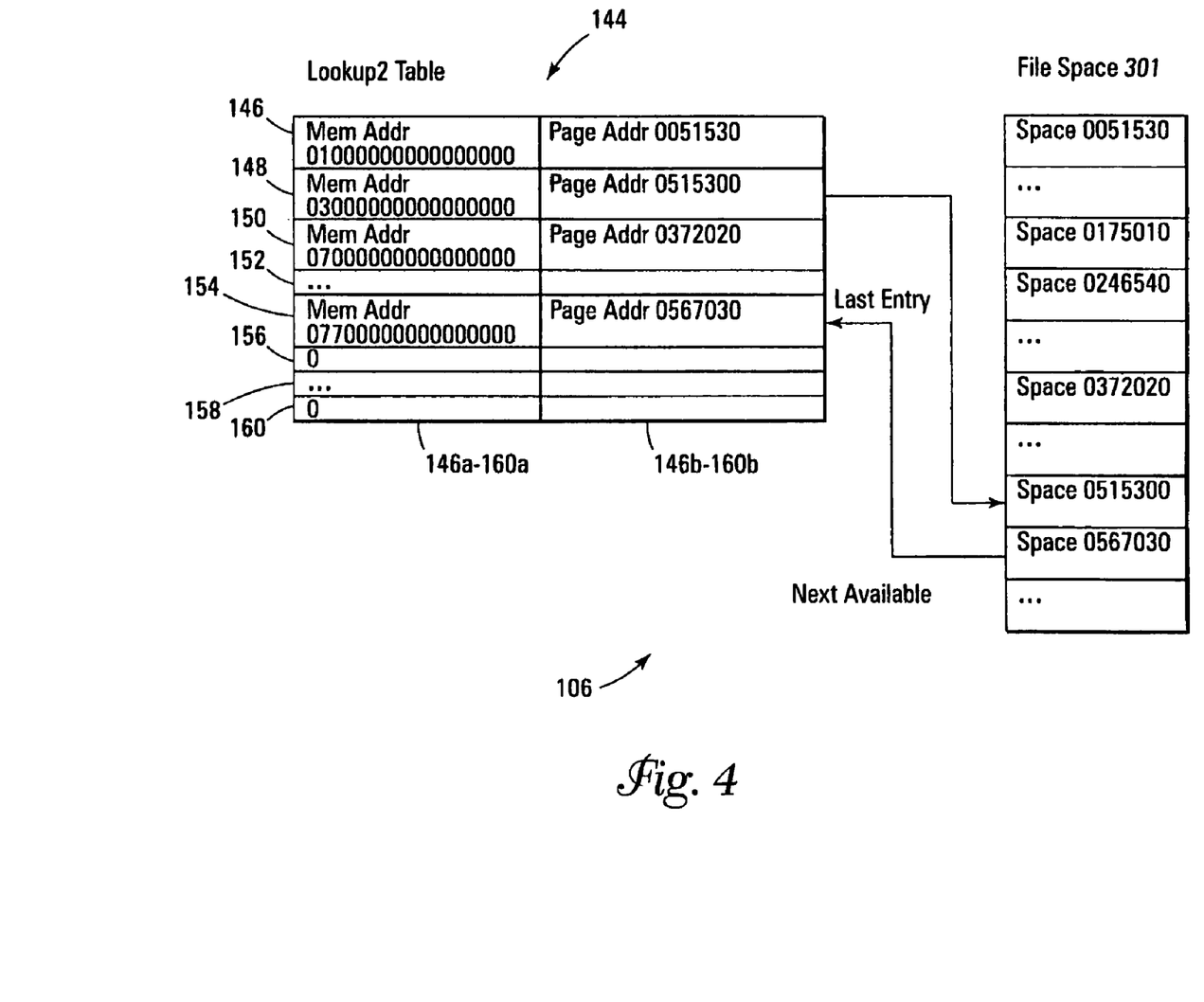
FIG. 4 is a block diagram of slow memory access in accordance with one embodiment of the present invention.

Referring now to FIG. 4, one embodiment of the slow memory access scheme 106 uses a look-up table 144 that is searchable by the main memory simulator 100 to determine whether a memory space has been allocated. The look-up table 144 comprises a plurality of entries 146–160, where each entry 146–160 comprises two fields 146a–160a and 146b–160b. The first fields 146a–160a contain main memory addresses and the second fields 146b–160b contain paging addresses that point to the file spaces 301 for those addresses. In one embodiment, slow memory access 106 is used for addresses that are greater than or equal to 01000000303000 words. In this embodiment, a slow memory entry points to a page space of 051350 words. Thus, the size of the paging space in the slow memory access look-up table 106 is the same as that of the fast memory access 104. If a main memory address is not found in the look-up table 144 after search, a new entry is generated and the paged address of the next available page space from the second file 114 or the third file 115 (see FIG. 2) is placed in the page address field. The next available page space address of the second file 114 or the third file 115 is then incremented and that space address is used for the next allocation, if needed.

In a preferred embodiment, look-up table 144 may be of any size but is preferably of a sufficiently large size to enable full main memory simulation to run on the main memory simulator 100. For example, if the look-up table 144 is sized too small, full main memory simulation will stop when the table is full. However, the size of look-up table 144 is limited by the size of the first file 112 in which look-up table 144 is stored when a simulation environment is saved.

In operation, a preferred embodiment of the main memory simulator 100 is capable of simulating a large computer system by booting and testing operating system software prior to corresponding hardware development completion and availability. The main memory simulator 100 is further capable of loading other programs that are commonly run on the operating system under test to simulate higher memory ranges and other use environments.

In one embodiment, the main memory simulator 100 may also save an entire simulation environment for future restoration and evaluation. As previously discussed, 65 banks are used to store the memory lookup tables: 64 banks for fast look-up and one bank for slow look-up. When a simulation environment is ended and the main memory simulator 100 exits, these 65 banks are stored in a file 112 (refer to FIG. 2). When it is desired at a later time to restore the simulation environment, the banks stored in the file 112 may be accessed and, by accessing the other simulation files 114 and 115, the entire simulation environment may be restored.

Figure 5:
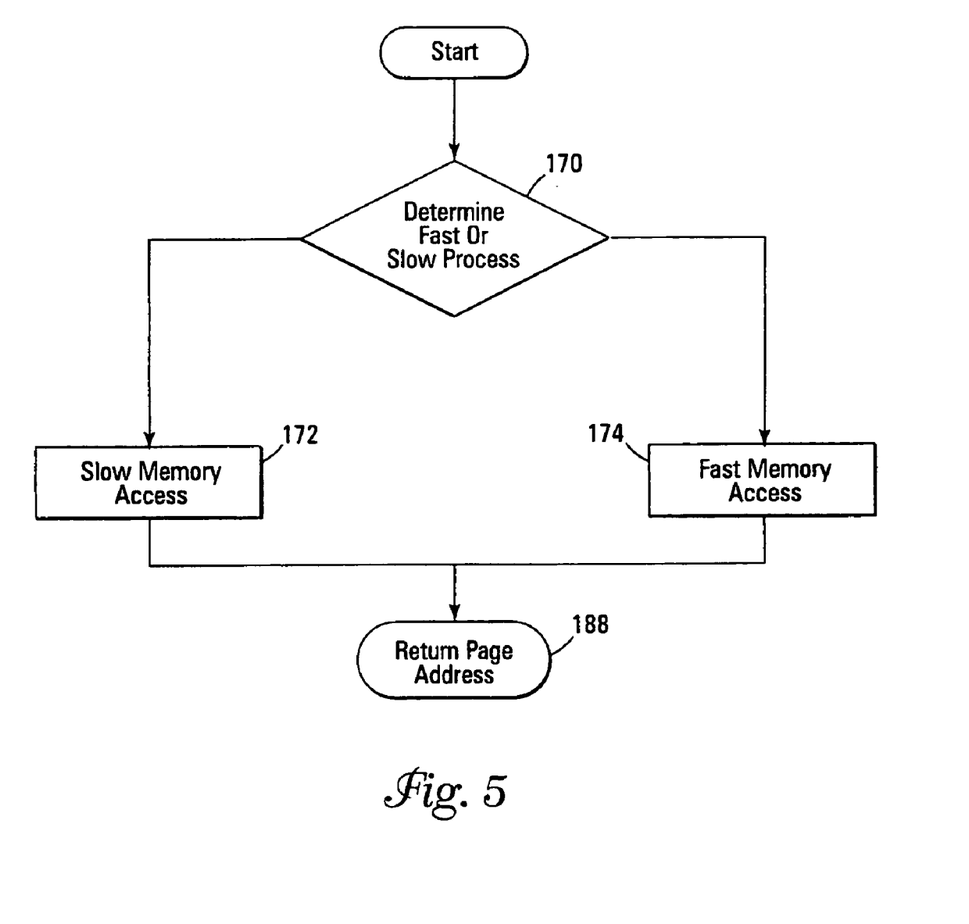
FIG. 5 is a flow chart of the memory access scheme in accordance with one embodiment of the present invention.

Referring to FIG. 5, the operation of the simulated memory access scheme 102 (see FIG. 2) is depicted in further detail. The simulated memory access scheme 102 first determines whether fast or slow memory access 174 or 172 should be utilized (170). After the appropriate access scheme 174 or 172 is selected and has run, the resulting page address is returned (188).

Figure 6:
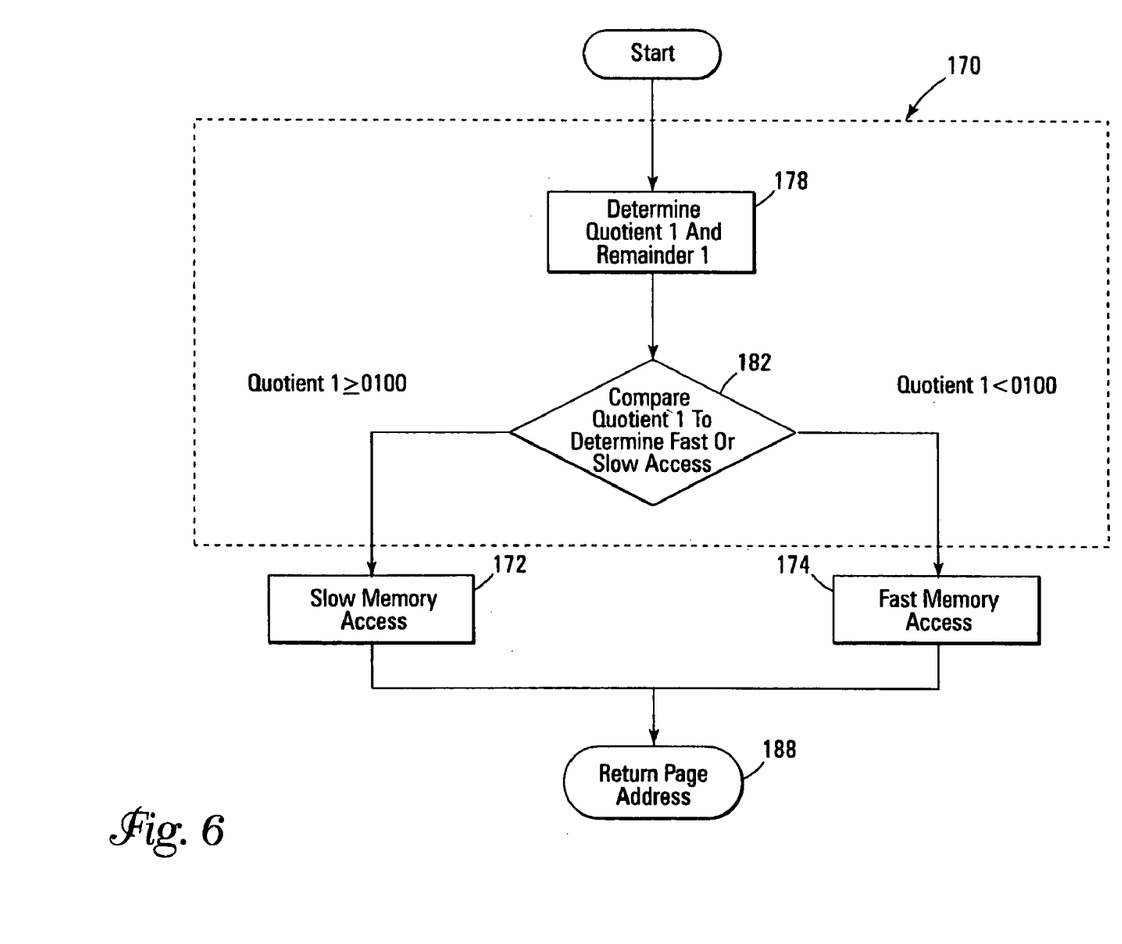
FIG. 6 is a flow chart of a memory access scheme decision in accordance with one embodiment of the present invention.

Referring to FIG. 6, the fast memory access 174 or slow memory access 172 determination (170) (see FIG. 5) is depicted in further detail. The first step in determining whether low-end memory will be accessed via fast memory access (174) or high-end memory will be accessed via slow memory access (172) is to divide the main memory address by the number of words in a look-up table to determine Quotient 1 and Remainder 1 (178). In a preferred embodiment, the main memory address is divided by 010000003030. If Quotient 1 is less than 0100 (182), the memory to be accessed is low-end memory and thus the fast memory access scheme will be used (174). If Quotient 1 is greater than or equal to 0100 (182), high-end memory will be accessed via the slow memory access scheme (172).

Figure 7:
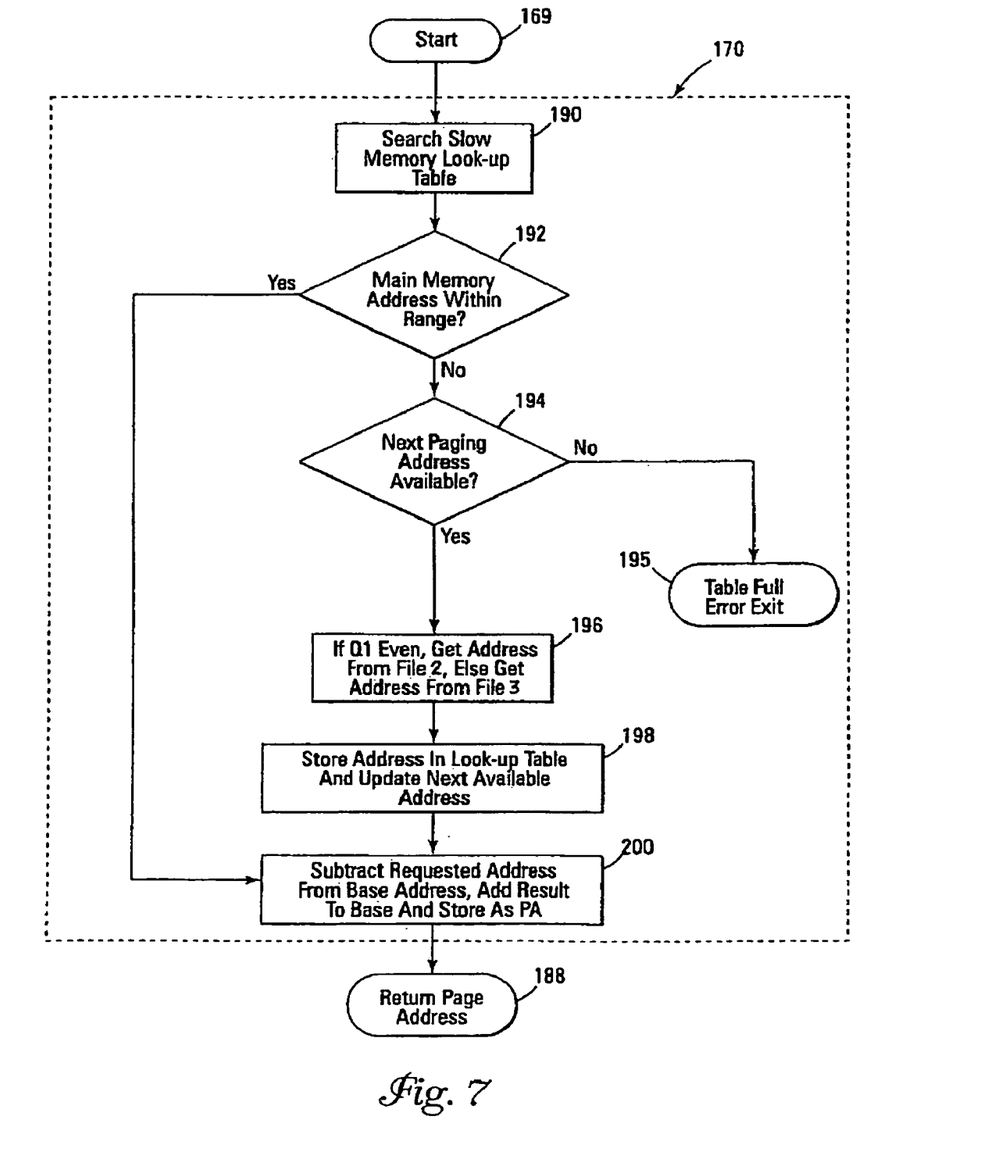
FIG. 7 is a flow chart of a slow memory access scheme in accordance with one embodiment of the present invention.

Referring to FIG. 7, the operation of the slow memory access scheme (172) is depicted in further detail. The main memory simulator 100 first searches the slow memory look-up table 144 (see FIG. 4) to determine if the main memory address is within the range of one of the entries (190). If an entry is found (192), the requested main memory address is subtracted from the base main memory address found in look-up table 144. The result of this operation is added to the base and stored in page address (200). The main memory simulator then returns the value from the page address (188), where the value represents the page address of the main memory space specified.

If the main memory address was not within the range of one of the entries (192), the next available paging address is obtained (194). If there is no available paging address, the look-up table 144 is full and the main memory simulator 100 performs an error exit (195). If Quotient 1 (see FIG. 6) is even, the next available paging address is obtained from the second file 114 (see FIG. 2) (196). If Quotient 1 is odd, the next available paging address is obtained from the third file 115 (see FIG. 2) (196). The resulting available paging address from either the second file 114 or the third file 115 is then stored in look-up table 144 (see FIG. 4) (198) and the next available paging address in either file two 114 or file three 115 is updated (198), depending upon which of the two files was used. The requested main memory address is subtracted from the base main memory address found in the look-up table 144 and the difference is added to the base and stored as the page address, PA (200). PA, which represents the page address of the main memory space specified, is then returned (188).

Figure 8:
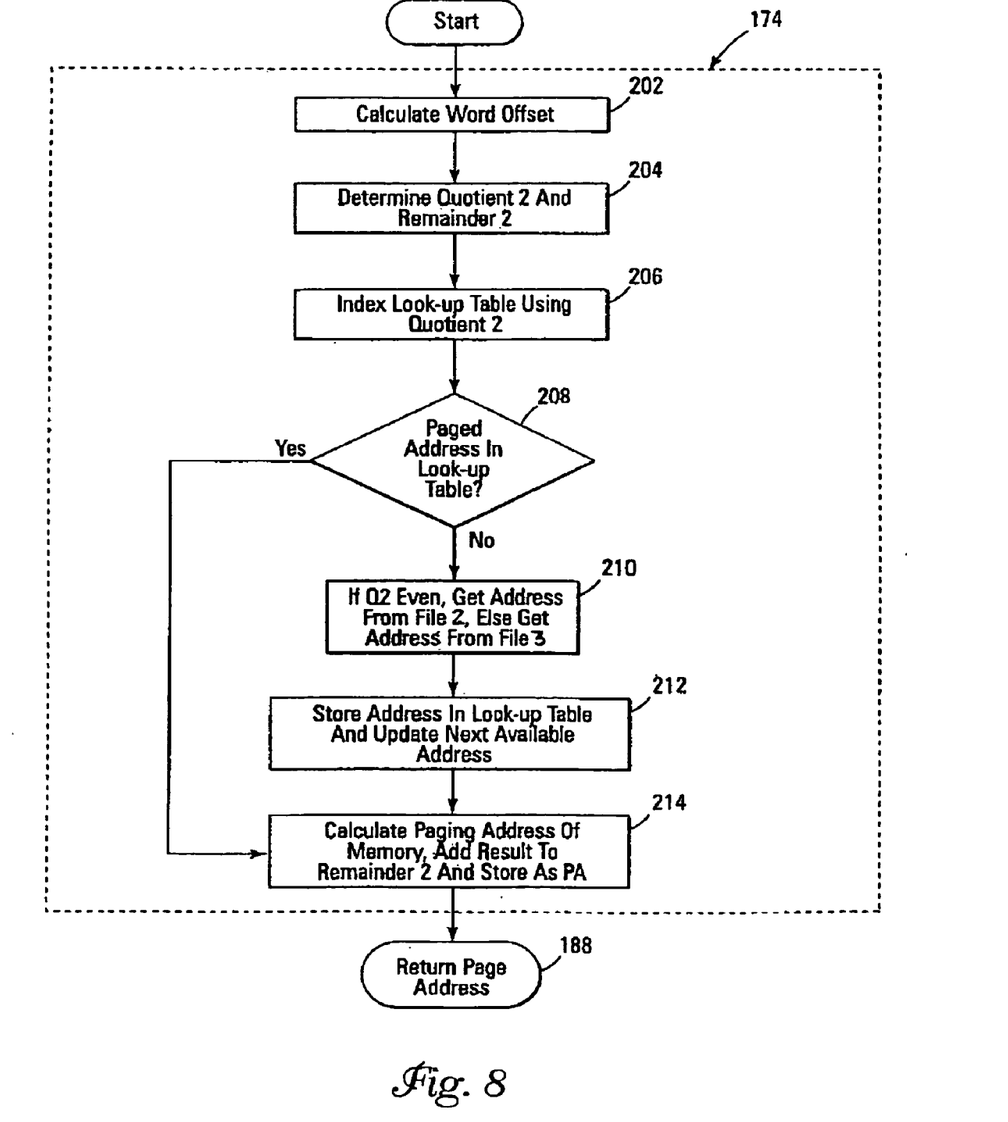
FIG. 8 is a flow chart of a fast memory access scheme in accordance with one embodiment of the present invention.

The fast memory access scheme (174) is depicted in further detail in FIG. 8. After the word offset in the fast memory look-up table 130, 132, and 134 (see FIG. 3) is calculated (202), Remainder 1 from the main memory address division 178 (see FIG. 6) is divided by 051530, the number of words in the virtual space of each memory space, to determine Quotient 2 and Remainder 2 (204). Quotient 2 is then used as an index into the look-up table 130, 132, and 134 (see FIG. 3) (206). The main memory simulator 100 next determines whether the paged address is in the fast memory access look-up tables 130, 132, and 134 (208). If the paged address is in the look-up table, the paging address of the memory is calculated and this page address is added to Remainder 1 and stored in the new addressing page address (214). The page address is then returned (188), where the paged address is the main memory space specified.

If the paged address is not found in the look-up table 130, 132, and 134 (208), Quotient 2 from the previous operation is evaluated to determine whether it is even or odd (210). If Quotient 2 is even, the next available paging address is fetched from the second file 114 (refer to FIG. 2), and if Quotient 2 is odd, the next available paging address is fetched from the third file 115 (210). This next available paging address from either the second file 114 or the third file 115 is then stored in the look-up table at the previous index (212). The next available paging address for either file 114 or 115, depending upon which was used, is then updated, the paging address of the memory is calculated, and the page address is added to Remainder 2 and stored in page address, PA (214). The page address is then returned (188), where the page address represents the main memory space specified.

Figure 9:
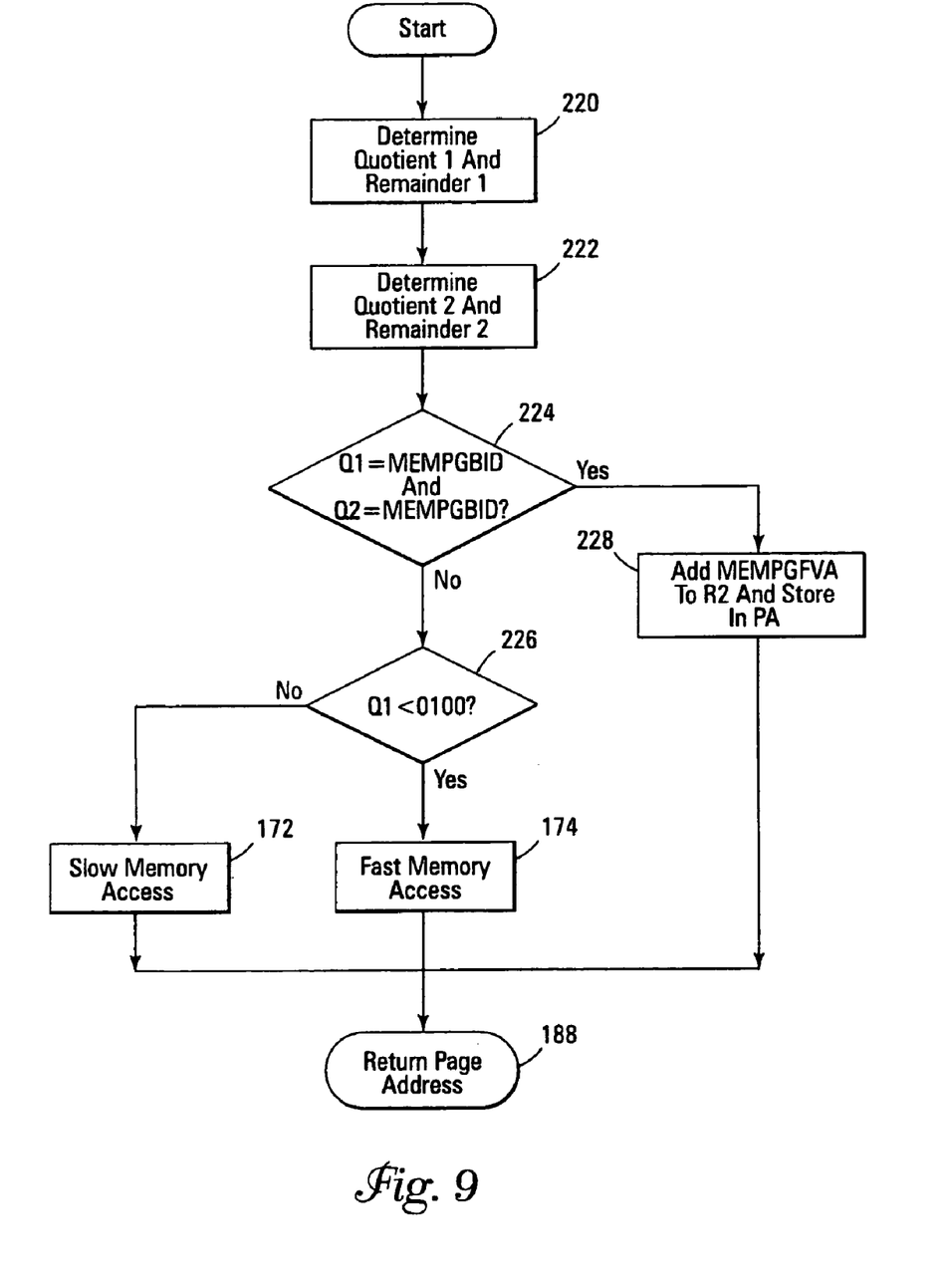
FIG. 9 is a flow chart of a performance enhancement technique in accordance with one embodiment of the present invention.

In a preferred embodiment, performance of the main memory simulator 100 may be further improved in both fast memory access and slow memory access by storing a set of words that contain the last memory address and the corresponding paging address in a look-up table, enabling more efficient location of the last memory address. This small look-up table is simply a set of three words stored in a memory bank. Two of the words, MEMPGBID and MEMPGPID, uniquely identify a main memory address block. The last word, MEMPGFVA, is the paging address of this memory block. Referring to FIG. 9, in this fast indexing scheme the main memory address is first divided by the number of words in a look-up table to determine Quotient 1 and Remainder 1 (220). Remainder 1 is then divided by 051530 to obtain Quotient 2 and Remainder 2, the word offset in the look-up table 130 (222). If Quotient 1 is equal to MEMPGBID and Quotient 2 is equal to MEMPGPID, the paging address of the last memory space referenced, MEMPGFVA, is added to Remainder 2 and stored as the paging address, PA (228). This paging address is then returned (188) and represents the page address of the main memory space specified. If Quotient 1 and Quotient 2 are not equal to MEMPGBID and MEMPGPID, respectively, the simulator 100 then compares Quotient 1 (226), as described above with reference to FIG. 5, to determine whether to use slow memory access (172) or fast memory access (174) and the resultant page address is returned (188).

When a simulation session run on the main memory simulator 100 of the present invention is complete or it is desired to interrupt the simulation session, the simulation environment may be saved and accessed at some later date. The size of the look-up tables used in both the fast memory access and slow memory access enables the simulator 100 to copy and save the tables into a finite set of files. When it is desired to access or continue a simulation session that has been saved to file, the entire environment, including the operating instructions, memory, and tables, may be restored from the saved set of files.

Although the present invention has been described with reference to particular embodiments, one skilled in the art will recognize that changes may be made in form and detail without departing from the spirit and the scope of the invention. Therefore, the illustrated embodiments should be considered in all respects as illustrative and not restrictive.

What is claimed is:

1. A main memory simulator for simulating large computer memories, wherein said large computer memories are defined by a plurality of target memory addresses, said simulator comprising:
   one or more mass storage devices having page addresses to simulate said target memory addresses;
   a memory cache; and
   a processor operable with said memory cache, wherein said processor operates under instructions
      to move data contained in a predetermined range of more frequently used target memory addresses between corresponding page addresses in said mass storage devices and said memory cache on a fast memory access basis, and
      to move data contained in a predetermined range of less frequently used target memory addresses between corresponding page addresses in said mass storage devices and said memory cache on a slow memory access basis.

2. The simulator of claim 1, wherein said fast memory access comprises the utilization of a set of fast lookup tables to directly obtain a page address that has been allocated to an address within the more frequently used range of target memory addresses.

3. The simulator of claim 1, wherein said slow memory access comprises the utilization of a slow lookup table to first determine if a page address has been allocated to an address within the less frequently used range of target memory addresses and to then obtain the allocated page address.

4. The simulator of claim 2, wherein said slow memory access comprises the utilization of a slow lookup table to determine if a page address has been allocated to an address within the less frequently used range of target memory addresses and the obtainment of said page address if allocated.

5. The simulator of claim 1, wherein the movement of data is achieved through a page transfer.

6. A main memory simulator for simulating large computer memories, wherein said large computer memories are defined by a plurality of target memory addresses, said simulator comprises:
 mass storage means for simulating said target memory addresses;
 means for storing data;
 means for processing instructions
  to transfer data,
   said data being transferred between said mass storage means and said means for storing
   via a fast memory access scheme if said data resides within a predetermined range of more frequently accessed target memory addresses or
   via a slow memory access scheme if said data resides within a predetermined range of less frequently addressed target memory addresses.

7. The simulator of claim 6, wherein said fast memory access scheme comprises utilizing a set of fast lookup tables.

8. The simulator of claim 7, wherein said fast lookup tables enable said means for processing to directly obtain a page address in said mass storage means corresponding to said data stored within said range of more frequently accessed target addresses.

9. The simulator of claim 6, wherein said slow memory access scheme comprises utilizing a slow lookup table.

10. The simulator of claim 9, wherein said slow lookup table enables said means for processing to first determine if a page address has been allocated to said data residing within said range of less frequently addressed memory addresses and then to obtain the allocated page address.

11. The simulator of claim 6, wherein said transferring of data is achieved through a page transfer.

12. A method for simulating large computer memories via one or more storage devices, wherein said large computer memories are defined by a plurality of target memory addresses, and wherein said large computer memories are large enough to prevent simulation via the use of one-to-one addressing for all of said plurality of memory addresses, the method comprising:
 obtaining a request for transfer of data residing within one of said target memory addresses if said data resides within a predetermined range of more frequently requested target memory addresses, then using a fast memory access scheme to do at least one of transferring the data to, and from, a corresponding address within said storage devices; and
 if the data resides within a predetermined range of less frequently requested target memory addresses, then using a slow memory access scheme to do at least one of transferring the data to, and from, a corresponding address within said storage devices.

13. The method of claim 12, wherein said fast memory access scheme comprises utilizing a set of fast lookup tables.

14. The method of claim 13, wherein said fast lookup tables enable direct obtainment of a page address in said storage devices corresponding to a target memory address within said range of said more frequently accessed target memory addresses.

15. The method of claim 12, wherein said slow memory access scheme comprises utilizing a slow lookup table.

16. The method of claim 15, wherein said slow lookup table first enables determining if a page address in said storage devices has been allocated to a memory address within said range of less frequently addressed target memory addresses that stores said data and then enables obtaining the allocated page address.

17. The method of claim 12, wherein said transfer of data comprises a page transfer.

18. A memory simulation system for simulating a main memory of a computer, comprising:
 a plurality of files, wherein said files include a fast look-up table and a slow look-up table,
  wherein said fast look-up table is operable to directly obtain a page address that has been allocated to simulate a corresponding main memory address that is within at least one of a predetermined range of more frequently accessed main memory addresses, and
  wherein said slow look-up table is operable to obtain a page address that has been allocated to simulate a corresponding main memory address that is within at least one of a predetermined range of less frequently accessed main memory addresses;
 a cache; and
 an interface to receive a request for transfer of data residing at a requested main memory address, said transfer occurring between at least one of said plurality of files and said cache via use of one of said fast look-up table and said slow lookup table.

19. The system of claim 18, wherein said plurality of files further include a last access look-up table, wherein said last access look-up table includes a last main memory address accessed and a page address allocated to said last main memory address accessed.

20. The system of claim 18, wherein if said requested main memory address is within said at least one predetermined range of less frequently used addresses, a list of addresses simulating said main memory addresses is searched in attempt to locate a page address allocated to said requested main memory address, and if said page address is not located, allocating said page address for said requested main memory address.

21. The system of claim 18, wherein both said fast look-up table and said slow look-up table are savable into a finite number of files.

22. The system of claim 21, wherein said fast look-up table and said slow look-up table are restorable from the saved files enabling a previously stopped simulation to continue.

23. The system of claim 18, wherein said fast look-up table is used to obtain a page address for any main memory address that resides within a predetermined lowest address range within main memory address space.

24. The system of claim 23, wherein said fast look-up table is divided into a plurality of banks, each bank having a defined number of words, and wherein said requested main memory address is divided by said defined number of words to obtain a quotient value, wherein said quotient value is compared against a predetermined value to determine whether said requested main memory address is within said at least one of said predetermined more frequently or said less frequently accessed main memory address range.

25. A memory simulation system for simulating main memory of a computer, the system comprising:
 means for receiving a data transfer request to transfer data between one or more storage devices simulating said main memory, wherein said data transfer request is defined by a main memory address within said main memory;

means for determining the frequency of use of said main memory address based on which one of multiple pre-defined address ranges within said main memory contains said main memory address;

means for obtaining a page address corresponding to said main memory address, wherein said means for obtaining includes:

means for obtaining said page address corresponding to said main memory address when said main memory address has been determined to be more frequently used; and means for obtaining said page address corresponding to said main memory address when said main memory address has been determined to be less frequently used; and means for transferring data between said page address of one of said storage devices and an address within a different one of said storage devices.

26. The system of claim 25, wherein said means for obtaining the page address when said main memory address is more frequently used comprises a set of fast lookup tables.

27. The system of claim 26, wherein said fast lookup tables enable said means for obtaining to directly obtain the page address of the more frequently used main memory address.

28. The system of claim 25, wherein said means for obtaining the page address when said main memory address is less frequently used comprises a slow lookup table.

29. The system of claim 28, wherein said slow lookup table enables said means for obtaining to first determine if a page address has been allocated to said main memory address and then to obtain that allocated pages address.

30. A method of memory transfer for use in simulating a main memory the method comprising:

obtaining a main memory address, wherein said main memory address indicates a request for a main memory transfer between a file simulating the main memory and a cache buffer;

determining, based on which of multiple pre-defined address ranges in said main memory contains said main memory address, whether said main memory address comprises memory that is accessed more frequently or less frequently;

if said main memory address comprises memory that is accessed more frequently, directly obtaining a page address that has been allocated to said main memory address through use of a first look-up table;

if said main memory address comprises memory that is accessed less frequently, first determining whether a page address has been allocated to said main memory address through use of a second lookup table, then obtaining the page address that has been allocated to said main memory address;

transferring data between said page address of said file and said cache buffer.

31. The method of claim 30, further comprising the step of saving the last main memory address accessed and the corresponding page address.

32. The method of claim 30, wherein said second look-up table contains a list of less frequently used ones of said main memory addresses for which page addresses have been allocated.

33. The method of claim 30, further comprising the step of saving said first look-up table and said second look-up table into a number of finite files.

34. The method of claim 33, further comprising the step of restoring said first look-up table and said second look-up table to continue a previously stopped simulation.

35. The method of claim 30, wherein said first look-up table is divided into a plurality of banks, each bank having a defined number of words, and wherein said step of determining is achieved by dividing said main memory address by said defined number of words to obtain a quotient value, then comparing said quotient value against a predetermined value, wherein the comparison provides an indication of whether said main memory address is more frequently or less frequently addressed.

* * * * *